April 18, 1950 — M. WELLS — 2,504,607
HEAVY DUTY WELDING ROD HOLDER
Filed Nov. 15, 1948
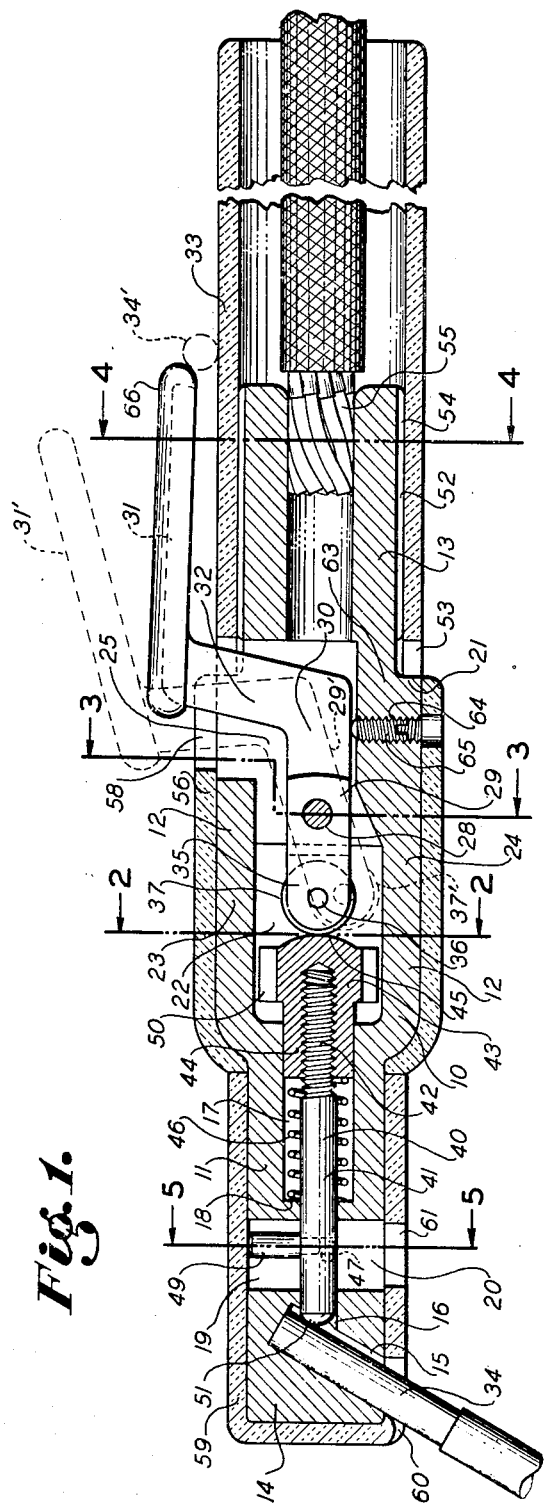
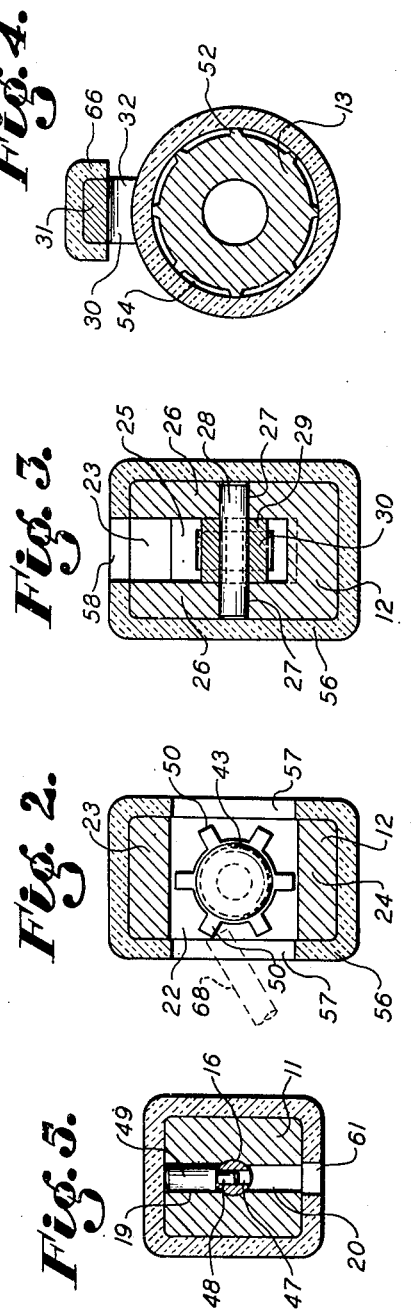
INVENTOR.
MARTIN WELLS
BY Jesse P. Whann
ATTORNEY Patented Apr. 18, 1950

2,504,607

UNITED STATES PATENT OFFICE 2,504,607

HEAVY-DUTY WELDING ROD HOLDER

Martin Wells, Pasadena, Calif.

Application November 15, 1948, Serial No. 60,129

8 Claims. (Cl. 219—8)

My invention relates to holders for welding rod employed in electric arc welding, and relates in particular to a heavy-duty electrode holder of improved characteristics which may be handled and operated with facility comparable to electrode holders of light type employed for holding of slender rods in light duty electric arc welding.

In heavy-duty electric arc welding rods of large diameter are used and heavy current values must be carried through the electrode holders to the rod held thereby. It is an object of my present invention to provide a heavy-duty welding rod holder having means for tightly gripping the end of the rod so as to make efficient electrical contacts therewith, and being so constructed as to provide a continuous unbroken path or conductor for the flow of electric current from the cable to the rod, thereby establishing in the holder a condition which minimizes heating of the holder resulting from the flow of electric current through the metal part thereof.

It is an object of the invention to provide a heavy-duty electrode holder having a continuous, one piece metal body extending from the cable to the end of the welding rod which is firmly gripped by the gripping means at the outer or forward end of the holder.

A further object of the invention is to provide a simple rugged and efficient rod gripping mechanism contained substantially wholly within openings formed in the continuous metal body of the holder, this gripping mechanism comprising parts so related that a heavy gripping force is exerted without exertion of great effort by the welder who is using the holder.

A further object of the invention is to provide in this heavy-duty electrode holder a gripping mechanism which may be easily adjusted to different sizes of rod by use of a length of welding rod as the adjusting instrument, thereby avoiding necessity of the welder bringing either hand or glove into contact with the adjusting mechanism. A feature of the invention is in the facility and ease, and also the short time, in which the mechanism may be actuated in releasing the end of a used-rod and inserting a new one.

A further object of the invention is to provide a heavy-duty welding rod holder having a rod gripping mechanism including an actuating lever which is disposed in such proximity to the handle of the holder as to facilitate its operation and it is a further object of the invention to provide a welding rod holder which may be quickly assembled from parts which are rugged in character.

Further objects and advantages of the invention will be brought out in the following part of the specification wherein I have described the details of a preferred embodiment of the invention so as to give a detailed disclosure without limiting the scope of the invention defined in the appended claims.

Referring to the drawings which are for illustrative purposes only:

Fig. 1 is a longitudinally sectional view, to substantially full scale of a preferred embodiment of my invention.

Fig. 2 is a cross section taken as indicated by the line 2—2 of Fig. 1.

Fig. 3 is a cross section taken as indicated by the line 3—3 of Fig. 1.

Fig. 4 is a cross section taken as indicated by the line 4—4 of Fig. 1.

Fig. 5 is a cross section taken as indicated by the line 5—5 of Fig. 1.

The form of the invention shown in the drawing includes a metal body 10 which is continuous from end to end. It is integrally formed from a metal of good electrical conductivity, such as bronze, and consists of a front portion 11, a middle portion 12, and a rear or handle portion 13. As shown in Figs. 1 and 5, the front portion 11 is of rectangular cross section, with rounded corners. Near the front end 14 of this front portion 11, there is a rod receiving opening 15 which intersects the forward end of an axial pin opening 16. The pin opening 16 extends rearwardly (rightwardly) to meet with a spring-receiving bore 17 of larger diameter than the opening 16, there being an annular shoulder 18 at the forward end of the bore 17. Upper and lower slots 19 and 20 intersect the pin opening 16 at a position between the rod-receiving opening 15 and the shoulder 18, these slots 19 and 20 lying in the plane defined by the axis of the rod opening 15.

The middle portion 12 of the metal body 10, shown also as being of rectangular cross section, is larger in cross section than the front portion 11, and projecting from the rear (rightward) end of the middle portion is the rear portion 13 of the metal body 10, this rear portion 13 being circular as shown in Fig. 4, and merging with the middle portion 12 at the rear-end shoulder 21 of the middle portion 12. As shown in Figs. 1 and 2, the middle portion 12 has in the forward substantially one-half thereof a transverse opening or window 22. This opening or window 22 extends from side to side of the middle portion 12 and communicates with the rightward end of the spring opening 17. The upper and lower margins of the window 22 are defined by parallel longitudinal bar portions 23 and 24 of the middle portion 12. In the rightward half of the middle portion 12 there is a channel or space 25 which connects the rightward end of the window 22 with the upper face of the middle portion 12. As shown in Figs. 1 and 3, this channel 25 exists between parallel side walls 26 of the middle portion 12.

In the front or leftward portions of the side walls 26 there are pin openings 27 to receive a transverse pin 28 on which the inner portion 29 of a lever 30 is swingable from a position substantially aligned with the axis of the pin opening 16 to an angular position indicated by dotted lines 29'. This lever 30 has an outer portion 31 which is connected to the inner portion 29 by a transverse portion 32 which extends laterally within the channel 25 to the exterior, so that the outer portion 31 of the lever 30 comprises an actuating handle 31 for the lever 30, this outer or handle portion 31 lying substantially parallel and close to the handle 33 of the rod holder when the lever 30 is in position to effectuate clamping of a welding rod 34 in the opening 15, as shown in Fig. 1.

The forward (leftward) end 35 of the inner lever portion 29 projects into the window 22. The end 35 is fabricated, and on a transverse pin 36, carries a roller 37.

The lever portion 29 and the roller 37 form part of a clamping means which acts between the abutment formed by the pin 28 and the opening 15 to clamp the rod 34. This clamping means includes a thrust element 40 of adjustable length comprising a hard metal pin 41, with external threads 42 at its rearward end, and a cap nut 43 screwed thereon, this cap nut 43 having a cylindric projection 44 which extends into the rearward end of the opening 17. The cap nut 43 has a rounded rear face 45 and a spring 46, within the opening 17, acts between the shoulder 18 and the front end of the cylindric extension 44 to urge the thrust element 40 rightwardly to hold the convex face 45 thereof in engagement with the roller 37. The pin or bar 41 has therein a diametral opening 47 which receives the stem portion 48 of a pin 49 which extends within the slot 19 of the front portion 14, the pin 49 preventing rotation of the thrust bar 41. As shown in Figs. 1 and 2 the head portion of the cap nut 43 is in the opening or window 22 and has thereon radially projecting ribs or flutes extending parallel to the axis of rotation of the member 43 and providing a means whereby this nut 43 may be rotated on the threaded portion 42, to move it relatively to the bar 41 whereby the overall length of the thrust element 40 may be increased or decreased as may be required to bring the front end 51 of the bar 41 into engagement at proper pressure with the welding rod 34 when the roller 37 is moved from the retracted, dotted line position 37' thereof into the full-line position shown in Fig. 1.

As shown in Figs. 1 and 4, the rear portion 13 of the metal body 10 has thereon a plurality of longitudinally extending ribs 52, and the handle 33, which consists of a tube of fibrous insulating material is a press fit on the external faces of the ribs 52. The front end of the handle 33 has a plurality of notches 53 therein providing air openings which communicate with the air circulation spaces 54 between the inner face of the handle 33 and the rear body portion 13 and between the ribs 52. A cable 55 which extends within the handle 33, may be brazed to the rear end portion 13 of the metal body 10. A tubular insulator 56 encloses the middle portion 12 of the middle body 10. As shown in Fig. 2 it has openings 57 therein which communicate with the extremities of the window 22, and an opening 58 as shown in Figs. 1 and 3, which communicates with the outer end of the channel or space 25. A cup-shaped insulator 59, of removable and replaceable character, is fitted over the front portion 11 of the metal body 10. It has a rod opening 60 communicating with the rod opening 15, and a slot 61 communicating with the slot 20. This slot 20 has a dual purpose. It permits escape to the exterior of foreign particles which may pass from the rod opening 15 and through the pin opening 16 into the slot 20. Also it provides a space through which a drift pin may be passed to drive the stem portion 48 of the pin 49 out of the diametral opening 47 of the bar 41 should it be desired to remove this bar 41. In the bottom wall 62 of the middle portion 12, below the passage 25 there is a threaded opening 64 which receives an adjusting screw 65, the upper end of which screw 65 comprises an adjustable stop for the downward movement of the inner lever portion 29, whereby control of the position of the roller 37 on the convex face 45 of the nut 43 is accomplished. By this adjustment the roller 37 is prevented from rolling too far over the convex face 45 to interfere with easy release of the rod clamping means, which release is accomplished by swinging the handle portion 31 of the lever 30 from the full line to the dotted line position 31' thereof. When release of the rod 34 is desired, the operator may move the end of the new rod leftwardly from the position indicated by the dotted circle 34', engaging the insulator 66 which is fitted on the handle 31, causing this handle to snap outward from its full line position to its dotted line position 31', the spring 46 acting at this time to retract the bar 41 and the nut 43 rightwardly, releasing the used rod 34 from the rod opening 15. The end of the rod indicated at 34' is then inserted in the rod opening 15 and the handle 31 is moved back to its full line position, the roller 37 being thereby caused to ride up on the convex face 45 of the member 43 to move the thrust element 40 into engagement with the end of the new rod with such heavy pressure as to produce very good electrical contact between it and the front end 14 of the metal body 10. In assembling the rod holder, the bar 41 is passed through the channel 25 and the window into the axial openings 16 and 17. The pin 49 may be then installed and the spring 46 placed in the opening 17 around the bar 41. The cap nut 43 is then moved into the window 22 and is screwed on the threaded end 42 of the bar 41. Then, the lever 30 is passed in through the channel 25 and the transverse pin 28 is passed through the openings 27 and through the lever. Thereafter, the insulator 56 is placed over the middle portion 12, covering the ends of the pin 28, and the insulator 59 is placed on the front portion 11, covering the slot 19 and preventing movement of the pin 19 out of engagement with the bar 41. Prior to or after the foregoing, the tubular handle 33 may be forced onto the rear portion 13 of the metal body 10.

Adjustment of the length of the thrust member 40 may be readily accomplished by rotating the nut member 43. As shown in Fig. 2 the end of the rod 68 is applied to ribs 50 of the nut member 43 exposed at an extremity of the window 22 to produce the desired rotation of the member 43. It will be understood that when a size of rod is changed the length of the thrust element 40 will be correspondingly changed by adjusting the nut member 43 on the bar 41 as just described. Welding rods 34 may be replaced in the holder with facility and rapidity and the welding rods may be clamped with very heavy clamping force. Minimum heating of the holder results from the provision of a continuous path of flow for the welding current from the cable 55 through the continuous metal body 10 to the rod 34 gripped by the holder.

I claim:

1. In an electrode holder: rigidly connected metal members forming an elongated metal body having at the rear end thereof means whereby the body may be connected to an electric cable, having a rod receiving opening in the front portion thereof and a window in an intermediate portion thereof, a channel to receive a clamping pin connecting said window with said rod receiving opening, and a passage connecting said window with a side face of said metal body; a clamping pin in said channel, there being threads on the rear end of said pin; means for limiting rotation of said pin; a nut member on the rear end of said pin, said nut member having thereon projections shaped so as to be engageable through said window by a rod end for rotation to adjust it on the threads of said screw; a spring in said channel engaging said nut member to move said member and said pin rearwardly; a lever extending through said passage, there being a roller on the inner end of said lever to engage said nut and move it forwardly as said lever is moved from an angular position to a position aligned with said pin means supporting said lever so that it may be swung between said positions; and a handle on the outer portion of said lever positioned so that it will lie close to said metal body when said lever is aligned with said pin and will project from said metal body when said lever is in its angular position.

2. In an electrode holder: rigidly connected metal members forming an elongated metal body having at the rear end thereof means whereby the body may be connected to an electric cable, having a rod receiving opening in the front portion thereof and a window in an intermediate portion thereof, a channel to receive a clamping pin connecting said window with said rod receiving opening, and a passage connecting said window with a side face of said metal body; a clamping pin in said channel, there being threads on the rear end of said pin; means for limiting rotation of said pin; a nut screwed on said pin and having a head portion with a rear face in said window and shoulders engageable through said window for rotating said nut; a lever extending through said passage, there being a roller on the inner end of said lever to engage the rear face of said nut and move it forwardly as said lever is moved from an angular position to a position aligned with said pin means supporting said lever so that it may be swung between said positions; and an insulated handle on the outer portion of said lever for operating said lever.

3. In an electrode holder: rigidly connected metal members forming an elongated metal body having at the rear end thereof means whereby the body may be connected to an electric cable, having a rod receiving opening in the front portion thereof and a window in an intermediate portion thereof, a channel to receive a clamping pin connecting said window with said rod receiving opening, and a passage connecting said window with a side face of said metal body; a clamping pin in said channel, there being threads on the rear end of said pin; means for limiting rotation of said pin; a nut on the rearward end of said pin having shoulders engageable through said window for rotation of the nut; a lever extending through said passage, there being a roller on the inner end of said lever to engage said nut and move it forwardly as said lever is moved from an angular position to a position aligned with said pin means supporting said lever so that it may be swung between said positions; a handle on the outer portion of said lever for operating said lever; and adjustable means for limiting the movement of said lever in one of its directions of movement.

4. In an electrode holder: rigidly connected metal members forming an elongated metal body having at the rear end thereof means whereby the body may be connected to an electric cable, having a rod receiving opening in the front portion thereof and a window in an intermediate portion thereof, a channel to receive a clamping means connecting said window with said rod receiving opening, and a passage connecting said window with a side face of said metal body; clamping means, adjustable in length, extending in said channel from said pin opening to said window; a lever extending through said passage, there being means on the inner end of said lever to engage the rearward end of said clamping means and move it forwardly as said lever is moved from an angular position to a position aligned with said clamping means supporting said lever so that it may be swung between said positions; a handle on the outer portion of said lever for operating said lever; and adjustable means for limiting the movement of said lever in one of its directions of movement.

5. In an electrode holder: an elongated metal body having at the rear end thereof means whereby the body may be connected to an electric cable, having in the front end thereof a rod receiving opening and having a channel extending rearwardly from said opening; a clamping pin in said channel; an extensible part in threaded engagement with said pin so that relative rotation of said part and said pin will effect axial adjustment of said part relatively to said pin; adjusting means operative from the exterior of said body for rotating said part relatively to said pin; and lever means supported on said body operative to apply forward force to said part to cause movement of said pin toward said rod receiving opening.

6. In an electrode holder: an elongated metal body having at the rear end thereof means whereby the body may be connected to an electric cable, having in the front end thereof a rod receiving opening and having a channel extending rearwardly from said opening; a clamping pin in said channel; an extensible part in threaded engagement with said pin; means for rotating said part relatively to said pin; and lever means for actuating said clamping means, said lever means having a part to thrust forwardly against said extensible part and a part to react against said body as said lever is moved from a non-clamping to a clamping position.

7. In an electrode holder: rigidly connected metal members forming an elongated metal body having means at the rear end thereof for connection to an electric cable, a rod receiving opening at the front end thereof, a cavity in the intermediate portion thereof and a channel connecting said cavity and said rod receiving opening; a rod clamping mechanism in said cavity and said channel, comprising parts adjustably related and movable from released position to clamping position wherein one of said parts will be projected into said opening to engage said rod, and means operative to adjust the adjustably related parts so as to vary the projection of said one of said parts into said opening; a swingable handle disposed on the exterior of said body; and lever means extending into said cavity and being operative by said handle to actuate said rod clamping mechanism from released position to clamping position.

8. A device as defined in claim 7 having adjustable means for limiting the movement of said lever in one of its directions of movement.

MARTIN WELLS.

REFERENCES CITED

The following references are of record in the file of this patent:

UNITED STATES PATENTS

| Number | Name | Date |
|---|---|---|
| 396,877 | Kennedy | Jan. 29, 1889 |
| 806,815 | Klemm | Dec. 12, 1905 |
| 1,694,140 | O'Neill | Dec. 4, 1928 |
| 2,060,606 | Bowlus | Nov. 10, 1936 |
| 2,325,926 | Weed | Aug. 3, 1943 |
| 2,452,876 | Shaw | Nov. 2, 1948 |